US005818595A

United States Patent [19]

Adachi et al.

[11] Patent Number: 5,818,595

[45] Date of Patent: Oct. 6, 1998

[54] WORK PIECE BUTT POSITION DETECTING METHOD FOR BUTT WELDING

[75] Inventors: Kaoru Adachi, Hirakata; Kazuhiko Ono, Takatsuki, both of Japan

[73] Assignee: Komatsu Ltd., Tokyo, Japan

[21] Appl. No.: 817,275

[22] PCT Filed: Oct. 11, 1995

[86] PCT No.: PCT/JP95/02070

§ 371 Date: Apr. 10, 1997

§ 102(e) Date: Apr. 10, 1997

[87] PCT Pub. No.: WO96/11080

PCT Pub. Date: Apr. 18, 1996

[30] Foreign Application Priority Data

Oct. 11, 1994 [JP] Japan .................................... 6-272853

[51] Int. Cl.[6] .............................. G01B 11/24; B23K 9/12

[52] U.S. Cl. ...................................... 356/376; 219/124.34

[58] Field of Search ......................... 219/124.34, 121.64, 219/121.63; 356/376

[56] References Cited

U.S. PATENT DOCUMENTS

| | | | |
|---|---|---|---|
| 3,855,446 | 12/1974 | Kotova et al. | 219/125 |
| 4,412,121 | 10/1983 | Kremers et al. | 356/376 |
| 4,567,347 | 1/1986 | Ito et al. | 356/376 |
| 4,988,201 | 1/1991 | Sugitani et al. | 219/124.34 |
| 5,166,495 | 11/1992 | Ekelof et al. | 219/124.34 |

FOREIGN PATENT DOCUMENTS

| | | |
|---|---|---|
| 59-101295 | 6/1984 | Japan . |
| 59-150685 | 8/1984 | Japan . |
| 59-150686 | 8/1984 | Japan . |
| 61-123494 | 6/1986 | Japan . |
| 1-99791 | 4/1989 | Japan . |
| 3-50635 | 8/1991 | Japan . |
| 6-71470 | 3/1994 | Japan . |

*Primary Examiner*—Frank G. Font
*Assistant Examiner*—Zandra V. Smith
*Attorney, Agent, or Firm*—Sidley & Austin

[57] ABSTRACT

A workpiece butt position detecting method for butt welding for detecting with a high accuracy the butt position of workpieces, even having chamfered edges or sags at the ends thereof. Workpieces (1, 2) are scanned with a light beam (52) across a weld line (4), and the surface positions of the workpieces (1, 2) are measured by reflected light, whereby the position of the gradually lowering workpiece ends is determined. Recess detecting lines (62) lower than the upper surfaces of the workpieces (1, 2) are set in advance. When the detected surface positions cross the recess detecting lines (62), the lowest surface position (C) among the surface positions between the two crossed points can be determined as the butt position (48).

20 Claims, 8 Drawing Sheets

FIG. 6A
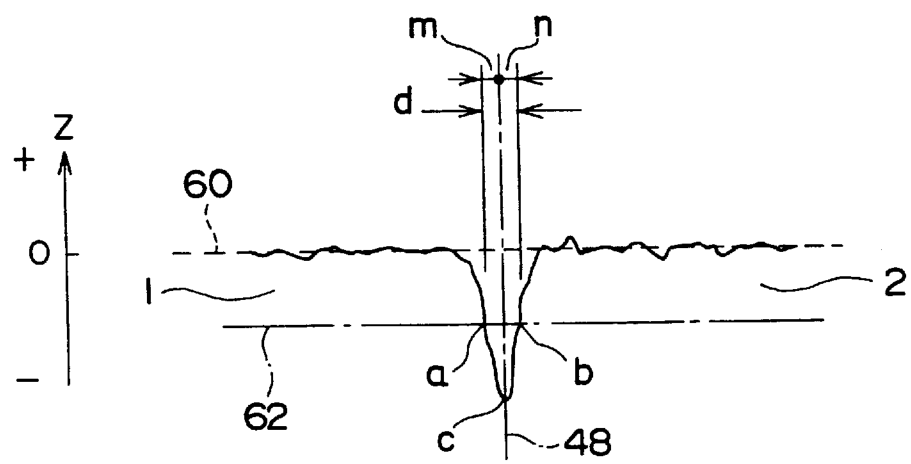
FIG. 6B
60
1
2
48
FIG. 6C
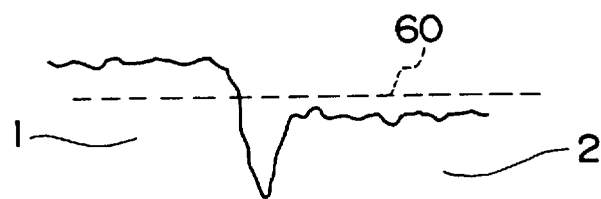

WORK PIECE BUTT POSITION DETECTING METHOD FOR BUTT WELDING

TECHNICAL FIELD

The present invention relates to butt welding in which the end surfaces of two workpieces are brought into contact with each other and welded by laser beams, and particularly to a workpiece butt position detecting method preferable for butt welding of workpieces cut by shears, presses, and the like.

BACKGROUND ART

Laser welding is the art of welding by narrowing laser beams down to fine beams, and is particularly suitable for welding thin plates, having plate thickness of 2 mm or less with high accuracy. However, in the case of using laser beams for plates of thickness of 1.6 mm or less, a tolerance limit of the deviation of the position of the laser beams from the butt position is in the range of −0.2 mm to +0.2 mm; therefore, any amount of the deviation of the beams greater than the above causes poor welding. As countermeasures against the above, various kinds of methods for detecting a workpiece butt position are proposed.

First, there is a method for detecting a butt position, that is, the position of a weld line, by spraying compressed gas from the back surface of a butt portion and by detecting the gas passing the butt portion on the front surface side (for example, Japanese Patent Application Laid-open No. 59-150685). Then, there is a method for detecting a butt position by irradiating light to the butt portion by a light emitting device positioned at the back side of the workpieces and by detecting the light passing the butt portion on the front surface side (for example, Japanese Patent Application Laid-open No. 61-123494).

However, by the above-described method using compressed gas or light, a butt position cannot be detected when a gap does not exist at a butt portion (a clearance between the workpieces butted against each other). In many cases, thin plates to be welded by laser are cut by a shear or a press, and when the workpieces cut by a shear or a press are butted against each other, a butt gap is not normally produced; therefore, a method for passing compressed gas or light is not applicable.

There is a method for detecting a butt position and a butt gap by taking an image of a butt portion with a CCD camera and by conducting image processing of the light and darkness (for example, Japanese Patent Application Publication No. 3-50635, Japanese Patent Application Laid-open No. 1-99791). In this method, a weld line is extracted by processing an image taken by a CCD camera and by discriminating, from the density, a weld line forming a butt portion from the other portion.

However, when workpieces have sags at the end portions, like the workpieces cut by a shear and a press, the portions of the sags form darkness; and therefore it is extremely difficult to detect, with an accuracy within ±0.2 mm, an actual weld line from a dark portion having a certain width. Further, the detection of a butt portion by image processing often causes misjudgment when a flaw is on the surface of a workpiece, and has a disadvantage of a long cycle time since the processing speed is slow.

Further, there is a method for detecting the position of a butt portion by generating an eddy current at the butt portion and by detecting the eddy current with the use of a magnetic force line type of sensor, or a method for detecting a butt position from the variation of current contact resistance (for example, Japanese Patent Application Laid-open No. 59-101295, Japanese Patent Application Laid-open No. 59-150686).

However, in the above-described methods, it is difficult to detect the butt position with the above-described accuracy, and there is a disadvantage of the detecting systems being expensive.

SUMMARY OF THE INVENTION

The present invention is made to eliminate the above-described disadvantages of the conventional art, and its object is to provide a workpiece butt position detecting method for butt welding by which the butt position of workpieces having chamfered edges or sags at the ends thereof can be detected with high accuracy.

The workpiece butt position detecting method for butt welding relating to the present invention is characterized by, when welding an end surface of a workpiece having a gradually lowering end portion of the surface to the end surface of the other workpiece, the steps of scanning a light beam irradiated to the workpieces by crossing a weld line, detecting the surface positions of the workpieces by reflected light from the workpieces, and detecting the gradually lowering workpiece ends. The light beam can be formed by using ordinary light or laser beams, and laser beams are desired to be used since laser beams provide stable and fine beams with less diffusion, and are hard to be influenced by external perturbations. When scanning a light beam, a scanning line of the beam can cross a weld line at any angle, but it is more suitable that the scanning line of the beam crosses the weld line at right angles, since calculation of the crossing position is easy.

When detecting a recess formed in the vicinity of the workpiece butt portion, a recess detecting line is previously set at a position lower than the top surfaces of the workpieces, and when the detected surface positions cross the recess detecting line, the lowest surface opposition among the surface positions between two crossing points can be determined as a butt position. A distance between two points, where the recess detecting line set at a position lower than the top surfaces of the workpieces crosses the surface positions, is obtained, and when the distance between the two points has a previously specified value or less, the distance between the two points is divided at a previously specified ratio, and the point, at which the distance is divided at the previously specified ratio, is determined as the butt position. However, when the distance between the two points is greater than a previously specified value, it is determined that welding cannot be done.

Further, a gap detecting line is set at a previously specified position below the recess detecting line, and when the detected surface positions do not cross the gap detecting line, the lowest surface position in the portion between two points, where the surface positions cross the recess detecting line, is determined as the butt position. Furthermore, by setting the gap detecting line at a previously specified position below the-recess detecting line, when the detected surface positions do not cross the gap detecting line, a distance between two points, where the detected surface positions cross the recess detecting line, is obtained; then the distance between the two points is divided at a previously specified ratio, and the point at which the distance is divided at the previously specified ratio can be determined as the butt position.

When the detected surface positions cross the above-described gap detecting line, the distance between two points, where the detected surface positions cross the gap detecting line, is obtained, and when the distance between the two points exists between a previously specified lower limit distance and an upper limit distance, the distance between the two points is divided at a previously specified ratio, and the point at which the distance is divided at the previously specified ratio is determined as the butt position. However, when the detected surface positions cross the gap detecting line and the distance between two points, where the detected surface positions cross the gap detecting line, is greater than a previously specified upper limit distance, it is determined that the welding cannot be done. Further, when the detected surface positions cross the gap detecting line and the distance between two points, where the detected surface positions cross the gap detecting line, is shorter than the previously specified lower limit distance, the lowest surface position among the surface positions between the two crossed points is determined as the butt position.

The recess detecting line can be set independently for each of two workpieces butted against each other. In the event that the detected surface positions cross the recess detecting line from above to below, when successive detected surface positions cross the recess detecting line from below to above in a previously specified scanning distance of the light beam, the above-described crossing from above to below is ignored. On the other hand, in the event that the detected surface positions cross the recess detecting line from below to above, when successive detected surface positions cross the recess detecting line from above to below in a previously specified scanning distance of the light beam, the above-described crossing from below to above is ignored.

According to the present invention constructed as in the above, the surface positions of the workpieces are obtained by scanning a light beam across the weld line, and the positions of the end portions of the workpieces are obtained by detecting a recess at the butt portion caused by sags at the end portions of the workpieces cut by a shear, a press or the like; therefore, an accurate butt position can be easily detected. In this case, minute irregularities exist on the surfaces of the workpieces, so that it is necessary to set a reference line for detecting a recess caused by sags. However, in the case when the workpieces are slanting, if the detected surface position of the workpiece is set as a reference line for detecting a recess caused by sags, the reference line sometimes does not cross the workpieces, so that a recess caused by sags cannot detect a recess caused by sags. Therefore, by setting the recess detecting line at a position lower than the top surface of the workpieces, the lowest position in the portion between two points where the detected surface positions of the workpieces cross the recess detecting line is determined as the ends of the workpieces, specifically, the butt position. The recess detecting line is set by obtaining a regression straight line at the top surface position by a least squares method from a previously specified number of detected results at the starting and the ending portions, and by moving the regression straight line in a direction of the depth of the workpiece (a direction of minus Z) as far as a previously specified distance parallel to itself.

However, if a gap is produced between the workpieces butted against each other, the butt position cannot be determined. Then, in this case, the distance between two points where the recess detecting line crosses the surface positions, namely the gap distance, is detected; and when this gap distance has a specified value or less, an accurate butt position can be obtained even if a gap exists, by determining as the butt position the point at which the gap distance is divided at a specified ratio. Then, when the distance between two crossing points exceeds a specified value, it is determined that welding cannot be done, since the gap is unsuitably large for welding; and poor welding is prevented from happening. As for the dividing ratio, if the methods for cutting two workpieces butted against each other are the same (for example, a shear and a shear, or a press and a press), the conditions of sags are the same; therefore, the ratio can be 1 to 1. If the cutting methods of two workpieces are different, such as a shear and a press, the conditions of sags are different, so that the dividing ratio is previously set by experiments or the like.

The presence or absence of the above-described gap is determined by setting the gap detecting line below the recess detecting line and by seeing whether or not the detected surface positions cross the gap detecting line. Thus, the gap is detected more reliably than in the case of using only the recess detection line; and in addition, the gap can be easily detected. When the detected surface positions do not cross the gap detecting line, a gap does not exist; therefore, the point dividing the distance between two points where the detected surface positions cross the recess detecting line at a previously specified ratio, or the lowest point on the detected surface positions, is determined as the butt position. If the lowest point on the detected surface positions is determined as the butt position, even when one of the workpieces is cut by a new blade while the other workpiece is cut by an old blade, and even when a dividing method cannot be used because of a difference being produced in the conditions of sags of the workpieces even by the same cutting method, the butt position can be obtained accurately.

On the other hand, when the detected surface positions cross the gap detecting line, it is determined that a gap exists, and if the distance between two crossed points exists between a previously specified lower limit distance and an upper limit distance, the point, at which the distance is divided at a previously specified ratio, is determined as the butt position. Thereby, even if a gap exists, the butt position can be obtained. However, when the distance between two crossings, where the gap detecting line crosses the detected surface positions, is greater than the upper limit distance (for example, 0.15 mm), the gap is greater than the gap which allows welding; therefore, it is determined that welding cannot be done. On the other hand, when the distance between two crossings, where the gap detecting line crosses the detected surface positions, is shorter than the lower limit distance (for example, 0.05 mm), the gap is small; therefore, the lowest position among the detected surface positions is safely determined as the butt position. There is a case in which two workpieces of different thicknesses are welded by butting against each other, and in this case, the recess detecting line is differently set according to the thickness of each workpiece. Further, there is a case in which a noise caused by minute irregularities on the workpieces or external perturbations is included in a measured value; therefore, when the distance, between the two successive crossing positions of the detected surface positions and the recess detecting line, has a previously specified reference value or less, the detected value is ignored by determining that the surfaces of the workpieces do not cross the recess detecting line at these two points, so that the influence of the noise is excluded.

BRIEF DESCRIPTION OF THE DRAWINGS

FIGS. 5A and 5B are views explaining a principle of the workpiece butt position detecting method relating to the present invention, wherein FIG. 5A is an explanatory view of the scanning by the laser position sensor, while FIG. 5B is an explanatory view of the section of the workpiece butt portion;

FIGS. 6A, 6B, and 6C are views showing the relationship between a regression straight line on the top surfaces of the workpieces and the workpieces relating to the embodiment, wherein FIG. 6A is an explanatory view of a case in which two workpieces of similar thickness are not slanting, while FIG. 6B is an explanatory view of a case in which the workpieces are slanting and FIG. 6C is an explanatory view of a case in which the workpieces have different thicknesses;

FIGS. 7A and 7B are views explaining a method for obtaining the butt position relating to the embodiment, wherein FIG. 7A is an explanatory view of a case in which the forms of the end portions of two workpieces are different, while FIG. 7B is an explanatory view of a case in which a difference of a level is produced on the workpiece butt surface;

FIGS. 10A and 10B are views explaining a method for eliminating the influence of external perturbations in the butt position detecting method relating to the embodiment, wherein FIG. 10A is an explanatory view in a case in which the end portions of the workpieces have irregularities, while FIG. 10B is an explanatory view in a case in which there is misdetection by a noise or the like.

BEST MODE FOR CARRYING OUT THE INVENTION

A preferable embodiment regarding a workpiece butt position detecting method for butt welding relating to the present invention will be particularly described below with reference to the attached drawings.

Figure 2:
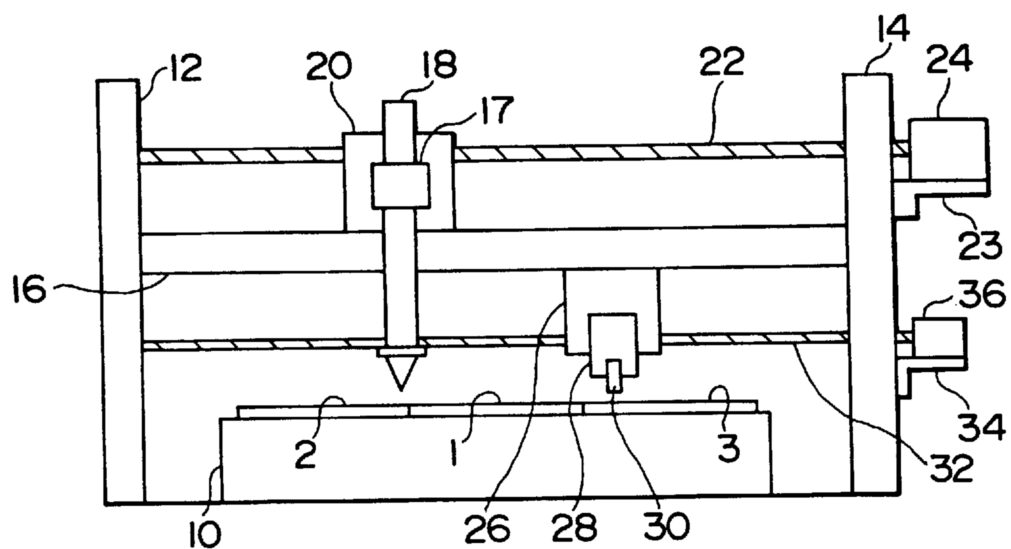
FIG. 2 is a front view of a laser welding apparatus to which the workpiece butt position detecting method relating to the present invention is applied.
Figure 3:
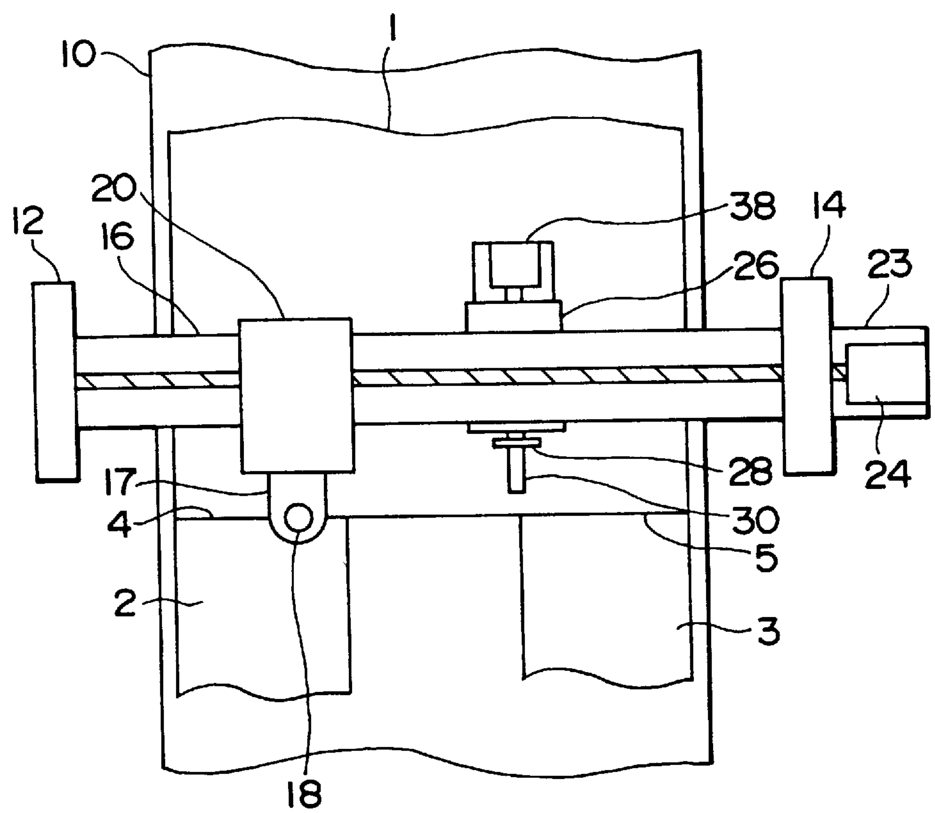
FIG. 3 is a plan view of an essential part of the laser welding apparatus in FIG. 2.

In FIGS. 2 and 3, workpieces 1, 2, and 3 to be welded are placed on a top surface of a bed 10, and at both sides of the bed 10, supports 12 and 14 are provided, while a guide beam 16 is supported between the supports 12 and 14. A laser welding torch 18 (hereinafter, referred to as a torch 18) is attached through an arm 17 to a guide block 20, which is provided on a top portion of the guide beam 16. The guide block 20 guides the torch 18 along weld lines 4 and 5 where the workpieces 1, 2, and 3 are butted against one another, with the lower part of the guide block 20 being slidably engaged with the guide beam 16 and with the upper part being engaged with a screw shaft 22. Both ends of the screw shaft 22 are supported by the supports 12 and 14, and one end is connected to a motor 24, which is attached to the support 14 by the medium of a bracket 23. Thereby the screw shaft 22 is rotated by the motor 24 and moves the torch 18 in a lateral direction in FIG. 2 by the medium of the guide block 20. The arm 17 advances and retreats the torch 18 relative to the guide block 20 and moves the torch 18 in a direction to cross the weld lines 4 and 5 at right angles.

On the other hand, a cam device 26 is provided at the lower part of the guide beam 16. The cam device 26 linearly reciprocates a laser position sensor 30, attached by the medium of a bracket 28, in a direction to cross the paper surface of FIG. 2 at a right angle, and is defined by, for example, a cylindrical cam or the like. The upper end portion of the cam device 26 is slidably engaged with the lower part of the guide beam 16 and is guided along the guide beam 16 in a lateral direction in FIG. 2. Further, the cam device 26 is engaged with a screw shaft 32, which is supported by the supports 12 and 14, and is guided along the guide beam 16 by the rotation of the screw shaft 32 to move in a lateral direction in FIG. 2. The screw shaft 32 is connected to a motor 36, which is attached at the support 14 by the medium of the bracket 34, and is rotated by the motor 36. A driving motor 38 drives the cam device 26 and reciprocates the laser position sensor 30.

Figure 4:
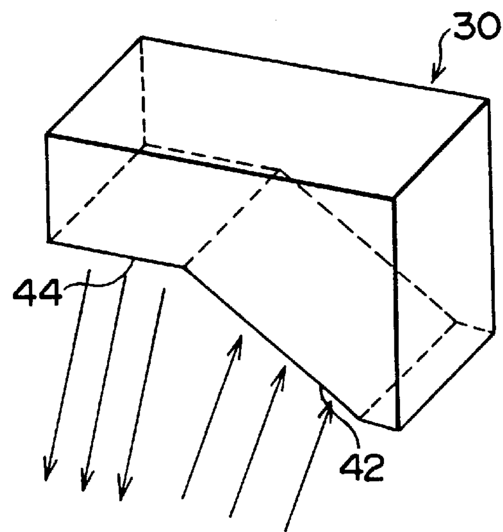
FIG. 4 is a perspective view of a laser position sensor relating to the embodiment.

FIG. 4 depicts an example of the construction of the laser position sensor 30, and slanting surfaces form a light receiving portion 42 and a light emitting portion 44. The laser position sensor 30 irradiates laser beams from the light emitting portion 44 to the workpieces 1, 2, and 3 while receiving the reflected light on the light receiving portion 42; and by detecting the displacement of the position where scattered light is condensed, the displacements of the heights of the workpieces 1, 2, and 3 are detected. Incidentally, a mechanism for reciprocating the laser position sensor 30 is not limited to the above-described cam device 26; and the laser position sensor 30 can be reciprocated by a cylinder, screw, or the like.

Figure 5A:
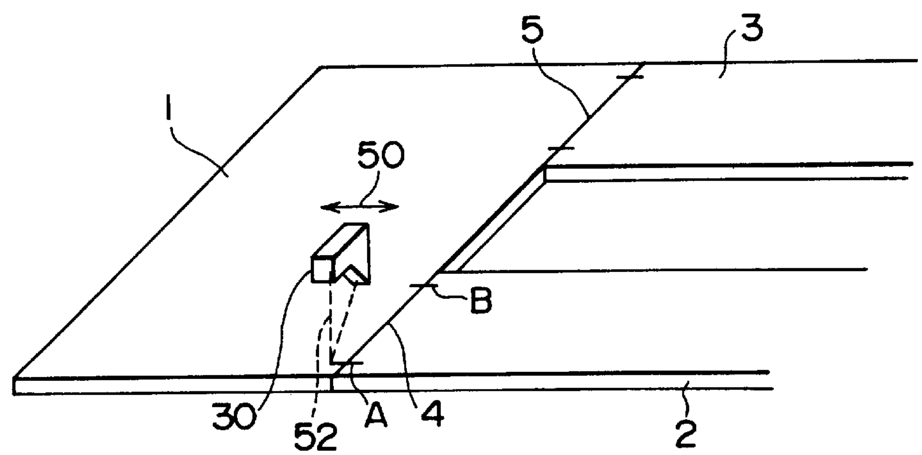

The weld lines 4 and 5 are detected by moving the laser position sensor 30 in a direction to cross the weld lines 4 and 5 at right angles (an arrow 50), as FIG. 5A illustrates. When the weld line 4 of the workpieces 1 and 2 is detected, intersecting lines A and B, located adjacent to the sides of the workpiece 2 in the width direction thereof, are scanned by a laser beam 52. In scanning along these intersecting lines A and B, the surface positions of the workpieces 1 and 2 are obtained, for example, for every 0.01 mm, and a workpiece butt position of the workpieces 1 and 2 is detected, based on the surface positions, to determine the weld line 4.

Figure 5B:
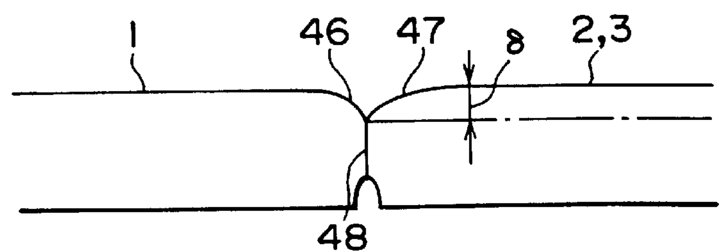

The above-described method for detecting the weld lines 4 and 5 is especially useful, for example, when the workpiece 1 is cut by a shear and the workpieces 2 and 3 are cut by a press. More specifically, as illustrated in FIG. 5B, the end portions of the workpieces 1, 2, and 3 are cut portions which become gradually lower, so that so-called sags 46 and 47 are produced, and a minute recess with a depth of $\delta$ is formed at a butt position 48. Accordingly, by detecting the final ends of the sags 46 and 47, the butt position 48 can be determined. The detection of the butt position 48 is carried out by inputting a detected signal from the laser position sensor 30 to a signal processing device (not illustrated in the drawings) such as, for example, a computer and the like.

In this signal processing device, detected data in a Z direction (a direction of the thickness of the workpieces) including the butt position 48, that is, detected data at every specified scanning pitch on the crossing lines A and B of the workpieces 1 and 2, are inputted, and the butt position 48 is calculated. In the present embodiment, each of the scanning lengths (the crossing lines A and B) of the laser position sensor 30 is 6 mm, and data are detected at every 0.01 mm. An example of the surface forms of the workpieces 1 and 2 by this detected data is shown by a solid line in FIG. 6A.

Then, in order to detect the width of a minute recess in a butt portion of the workpieces 1 and 2, a reference line is set. On setting the reference line, a regression straight line on the top surfaces of the workpieces is initially computed from the captured data by the least-squares method. This computation is carried out when scanning with the laser position sensor 30 by using a plurality of data previously specified at a starting portion and an end portion, for example, twenty data from the start and twenty data before the end. The regression straight line according to this computation is shown by a broken line 60 in FIG. 6A.

Incidentally, when the workpieces 1 and 2 are slanting as in FIG. 6B, or when there is a difference between the thicknesses of the workpieces 1 and 2 butted against each other as in FIG. 6C, it happens that the regression straight line 60 does not cross one of the workpieces 1 and 2, so that the width of the recess at a butt portion cannot be obtained. Then, as FIG. 6A illustrates, the regression straight line 60 is moved downwardly (in a direction of minus Z) as far as a previously specified distance parallel to itself, and a recess detecting line 62 is set. Generally, a width d of the portion between two points a and b, where detected surface positions of the workpieces 1 and 2 cross the recess detecting line 62, is obtained; and a point obtained by dividing the width d at a previously specified ratio of m:n is determined as the butt position 48. The reason is as follows.

Figure 7A:
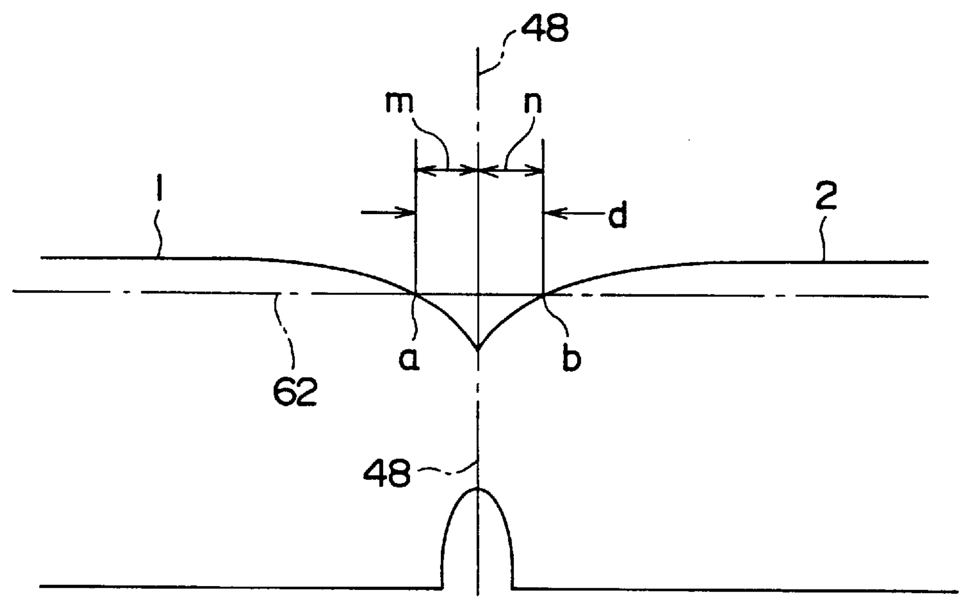

For example, when the workpiece 1 is cut by a shear and the workpiece 2 is cut by a press, the sag 46 of the workpiece 1 has a form different from that of the sag 47 of the workpiece 2 as in FIG. 5B, since a shear can generally cut more sharply than a press. Therefore, as enlarged and illustrated in FIG. 7A, the distance from a point a, where the surface of the workpiece 1 crosses the recess detecting line 62, up to the butt position 48 is different from the distance from a point b, where the surface of the workpiece 2 crosses the recess detecting line 62, up to the butt position 48. Specifically, if the mid-point of the detected width d is determined as a butt position, there exists a difference between the determined butt position and the actual butt position 48. The above-described proportionally dividing ratio of m:n is set in advance from experiments and so on according to cutting methods, materials of the workpieces 1 and 2, thickness of the plates, and the like. If two of the workpieces 1 and 2 are cut by the same method such as a shear, or a press, the m:n is 1:1.

Figure 7B:
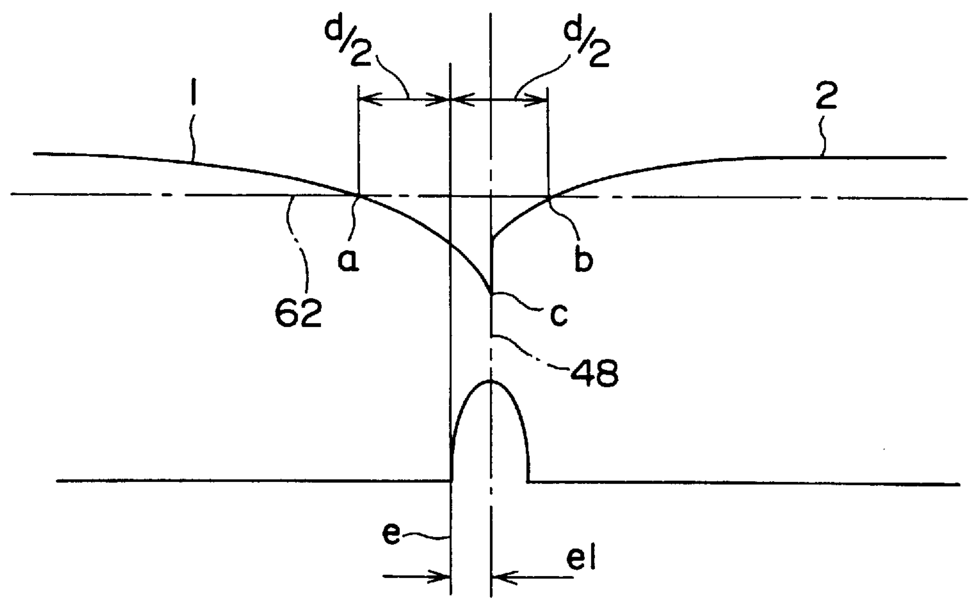

As illustrated in FIG. 6A, the butt position 48 can be also obtained by detecting the lowest point (the lowest point) c of the surface positions of the workpieces 1 and 2. The advantage lies in a case as in FIG. 7B. Specifically, even if the workpieces 1 and 2 are cut by the same method, when the workpiece 1 is cut with an old blade and the workpiece 2 is cut with a new blade, cutting with the old blade produces a greater "sag", and therefore a difference of level is produced on the butt surface. Therefore, if a mid-position e of the detected width d is determined as a butt position, there exists a difference el between the determined butt position and the actual butt position 48. Then, in this case, the accurate butt position 48 can be obtained by detecting the lowest point c.

Figure 8:
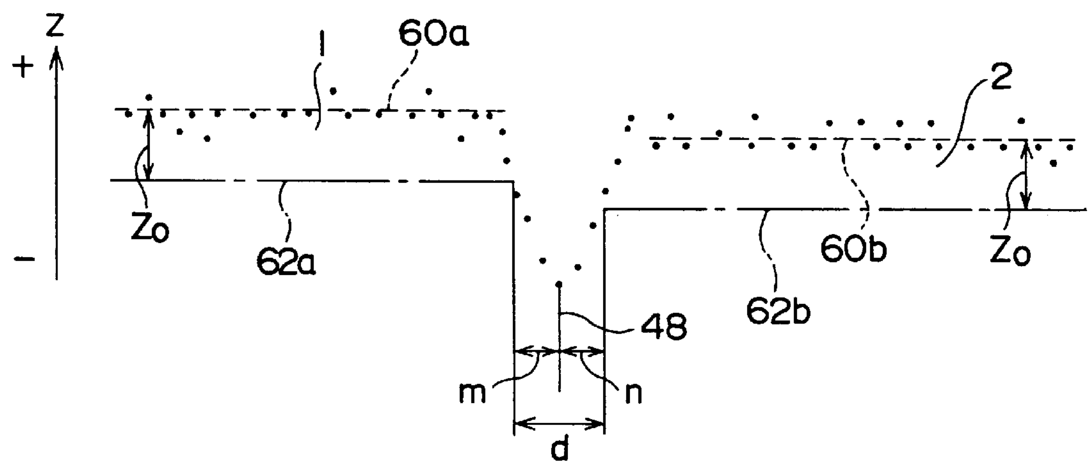
FIG. 8 is an explanatory view of a method for setting a recess detecting line in a case in which two workpieces butted against each other relating to the embodiment have different plate thicknesses.

When the thickness of the workpiece 1 and the thickness of the workpiece 2 are different (refer to FIG. 6C), recess detecting lines 62*a* and 62*b* in different positions are set according to thickness as FIG. 8 illustrates. Specifically, a regression straight line 60*a* for the workpiece 1 and a regression straight line 60*b* for the workpiece 2 are obtained from the data resulting from scanning by the above-described laser position sensor 30. Incidentally, the dots in the drawing are the plotted data (reflected signals) as a result of scanning, and show the surface positions of the workpieces 1 and 2.

Next, the recess detecting lines 62*a* and 62*b* are set by shifting the regression straight lines 60*a* and 60*b* as far as a previously specified value $Z_0$ in a direction of minus Z. A point where the surface positions of the workpieces 1 and 2 cross the recess detecting line 62*a* from above to below (or from the below to above) and a point where the surface positions of the workpieces 1 and 2 cross the recess detecting line 62*b* from below to above (or from above to below) are detected; and a point dividing the width d between the two above-described points at a previously specified ratio of m:n is determined as the butt position 48.

Figure 9:
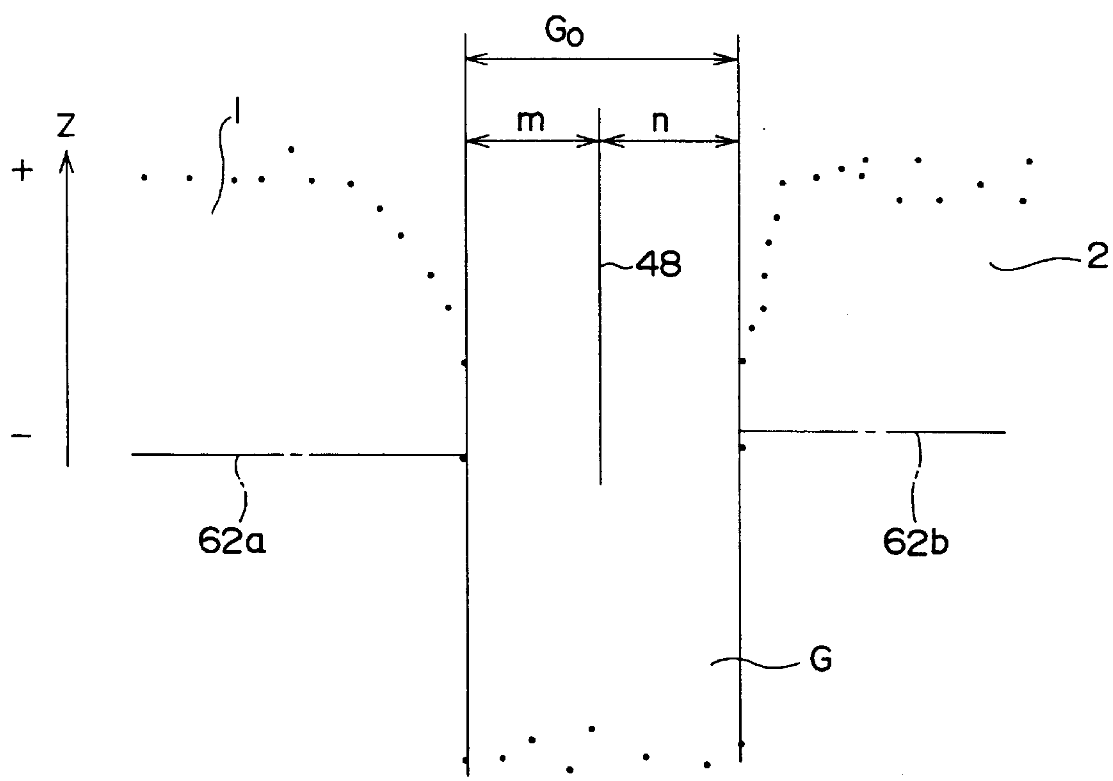
FIG. 9 is an explanatory view of a method for obtaining the butt position in a case in which a gap exists between two workpieces relating to the embodiment.

Incidentally, if a gap exists between the workpieces 1 and 2, when the crossing lines A and B are scanned by the laser position sensor 30, the butt position 48 sometimes cannot be found, since the suitable lowest point c cannot be obtained. Specifically, when a gap exists, the surface positions of the workpieces 1 and 2 in a gap G are detected as values extremely lower than usual, as in FIG. 9. Therefore, the recess detecting lines 62*a* and 62*b* are set with the thickness of the workpieces 1 and 2 being considered, and a portion between two points, where the detected surface positions cross the recess detecting lines 62*a* and 62*b*, is regarded as the butt gap G. Then the distance of the portion between the two points forming the gap G is detected as a gap distance G0, and a point dividing the gap distance G0 at a previously specified ratio of m:n is determined as the butt position 48. Incidentally, in the embodiment, two of the recess detecting lines 62*a* and 62*b* are set, but setting only one recess detecting line 62 is suitable.

Figure 10A:
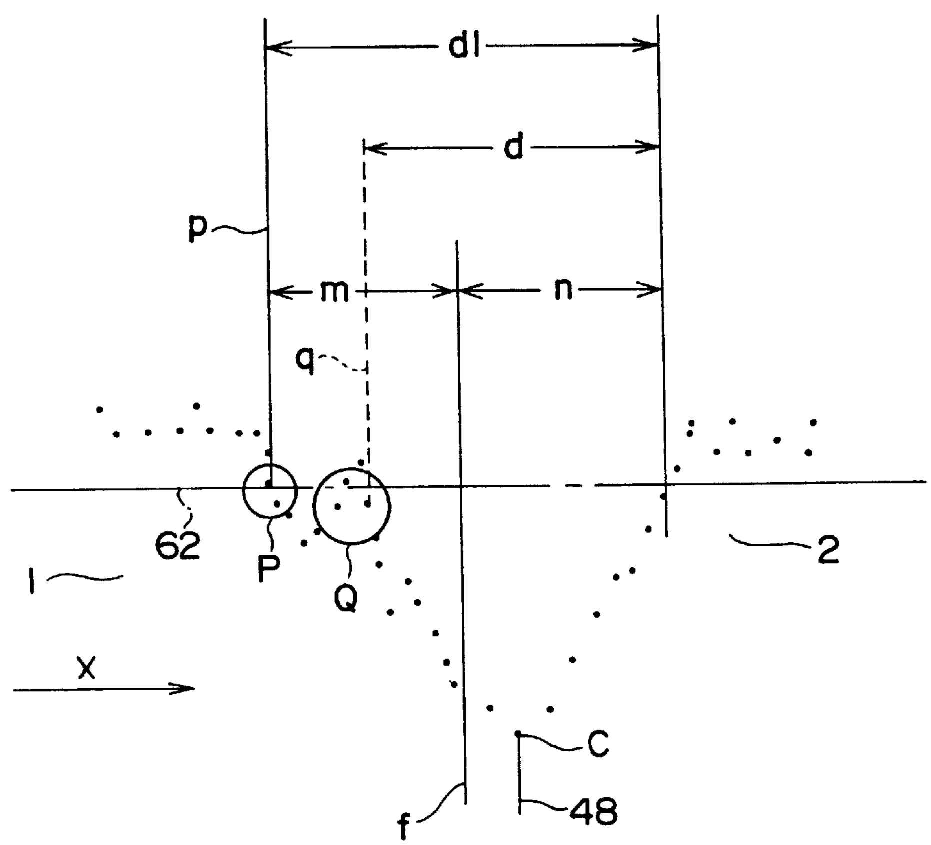

In FIG. 10A, when the laser position sensor 30 scans in a direction from left to right in the drawing (an arrow X), it sometimes happens that the surface positions cross the recess detecting line 62 a number of times, like a portion P and a portion Q, because of the irregularities on the workpieces 1 and 2 and external perturbations. If the position of a solid line p is assumed to be the crossing position while the position of a broken line q is an actual crossing position, a detected width d1 becomes larger than the actual width d. Accordingly, a point f dividing the width d1 at a ratio of m:n is off the actual butt position 48. Therefore, in order to avoid a disadvantage like this, when a detected value crosses the recess detecting line 62 from above to below and if a detected value crosses the recess detecting line 62 again within a previously specified number of detected cases (for example, ten), the position where the detected value initially crosses the recess detecting line 62 from above to below is determined as external perturbations and ignored, and that position is not used for detecting the width d. On the right side of the lowest point c (the workpiece 2), when a detected value crosses the recess detecting line 62 from below to above, the same procedure is taken.

Figure 10B:
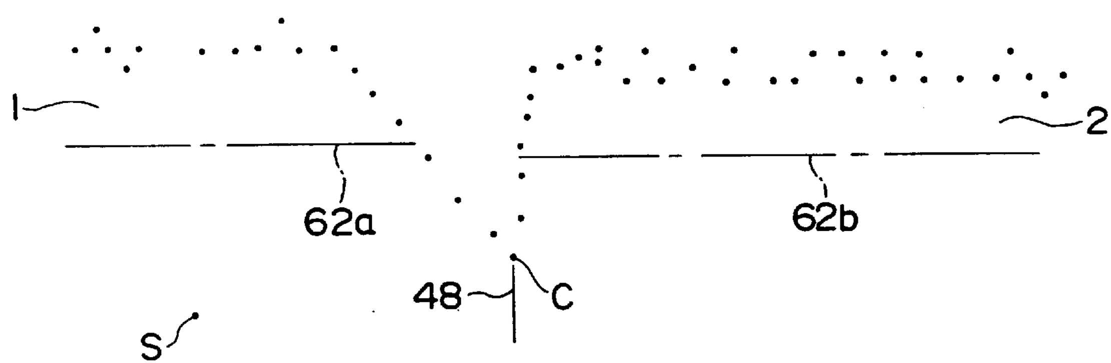

Further, when the lowest point c is obtained, there may be cases where one or two to three detected values are below the recess detecting lines 62*a* and 62*b*, and furthermore are below the lowest point c as a symbol S in FIG. 10B illustrates. Then, in order to avoid misdetection at the lowest point c in this case, the lowest point c is determined as the smallest detected value of a group of specific number (for example, ten) of successive detected values below the recess detecting lines 62*a* and 62*b*. The smallest value, namely, the lowest point c is determined as the butt position 48.

Figure 1:
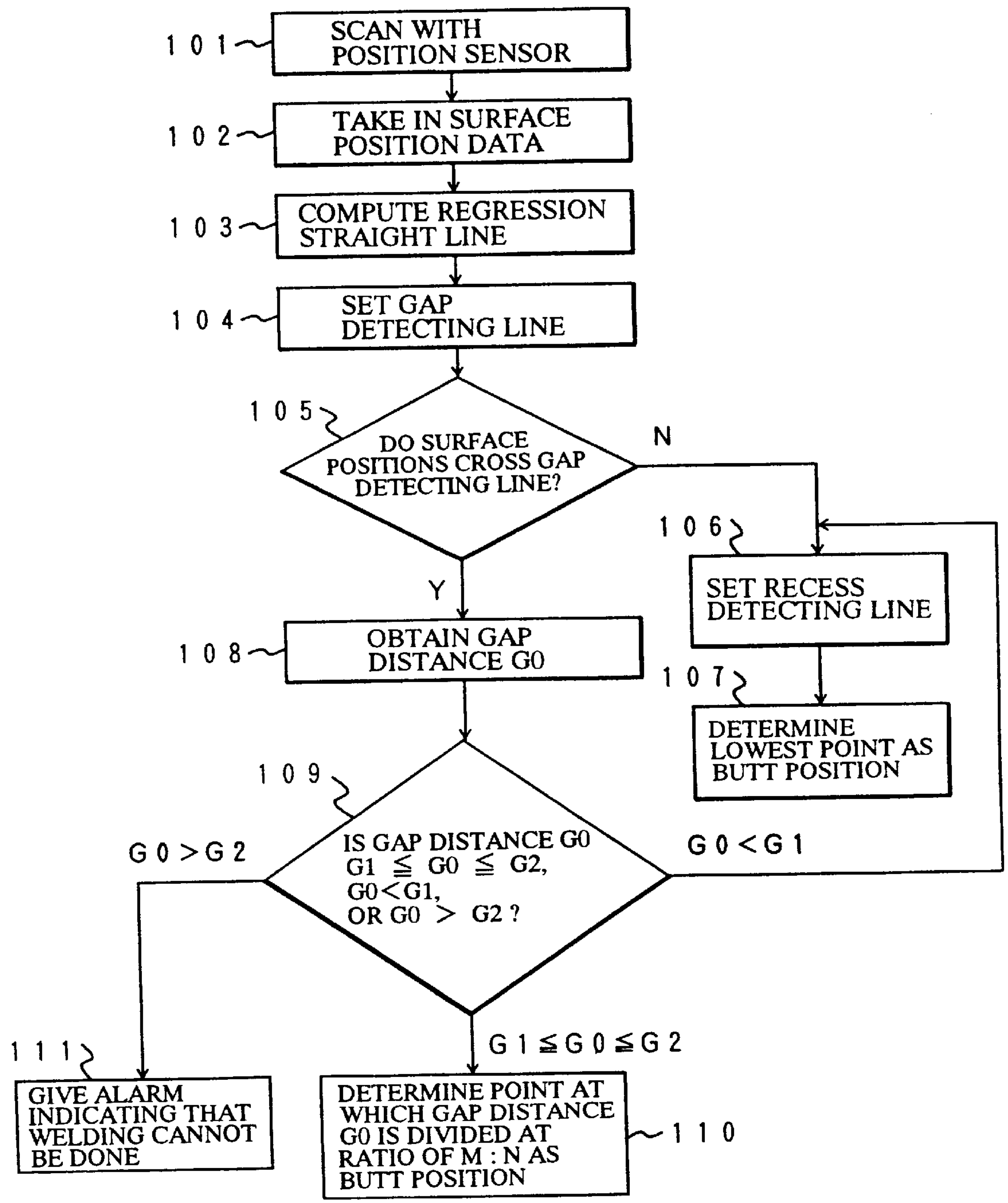
FIG. 1 is a flowchart of the workpiece butt position detecting method relating to an embodiment of the present invention.

Concrete steps of the above-described embodiment will be explained with reference to FIG. 1. Incidentally, the flowchart shows the case in which both of the recess detecting line and the gap line are used.

Figure 11:
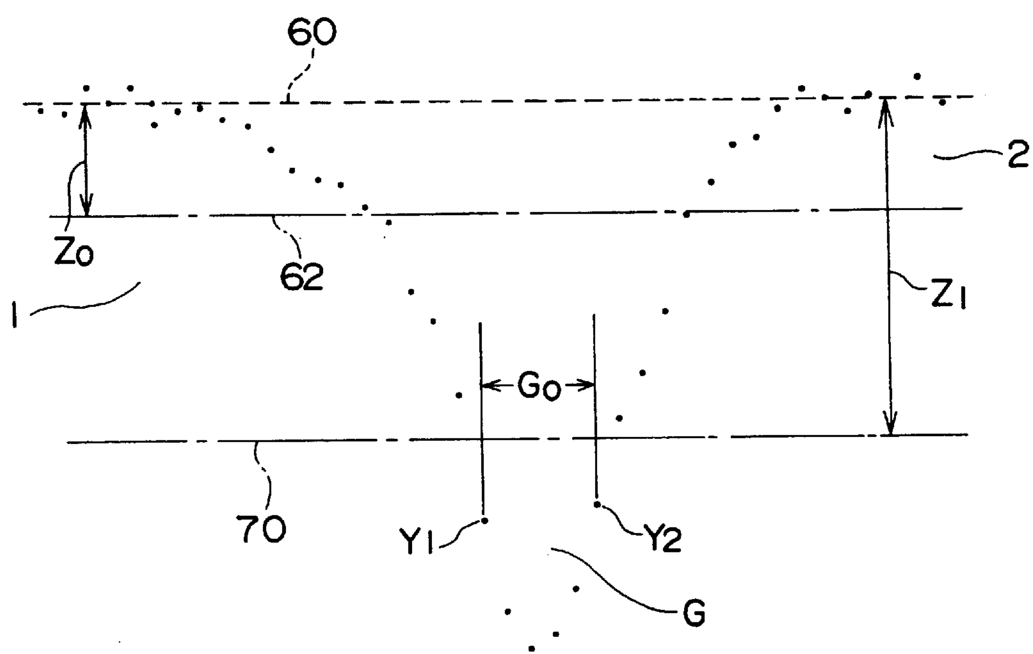
FIG. 11 is a view showing the relationship between the recess detecting line and the gap detecting line relating to the embodiment.

First, in Step 101, scanning is carried out with the laser position sensor 30 by crossing the weld line at right angles. The signal processing device (which is not illustrated in the drawings) takes in the position data on the surfaces of the workpieces at every specified scanning pitch of the laser position sensor 30 (Step 102). Next, the signal processing device computes the regression straight line 60 corresponding to the top surface positions of the workpieces 1 and 2 by a least squares method using N1 of the data from the start of scanning and N2 of the data before the end of scanning from the data taken in (Step 103). Thereafter, the signal processing device moves the regression line 60 in a direction of minus Z as far as Z1 (for example, 0.1 mm) parallel to itself as illustrated in FIG. 11 in order to detect the gap G, and sets the gap detecting line 70 (Step 104). Incidentally, the gap detecting line 70 is set at a position lower than the recess detecting line 62.

Next, the signal processing device determines whether or not the surface positions of the workpieces 1 and 2 cross the gap detecting line 70 (Step 105). When the surface positions do not cross the gap detecting line 70, the recess detecting line 62 (refer to FIG. 11) is created by shifting the regression straight line 60 downwardly as far as Z0 (for example, 0.02 mm) in Step 106. Thereafter, the signal processing device compares the detected surface positions to the recess detecting line 62, selects the lowest position (the lowest point c) from the group of successive detected values which are below the recess detecting line 62, and determines the lowest surface position as the butt position 48 (Step 107). The above-described butt position 48 can be a point dividing the portion between two crossing positions of the detected surface positions of the workpieces and the recess detecting line 62 at a previously specified ratio.

On the other hand, when the detected surface positions of the workpieces 1 and 2 cross the gap detecting line 70 in Step 105, go to Step 108, and the distance between two points Y1 and Y2 (refer to FIG. 11), where the detected surface positions cross the gap detecting line 70, is obtained as the gap distance G0. The gap distance G0 is compared to a previously specified lower limit distance G1 (for example, 0.05 mm) and upper limit distance G2 (for example, 0.15 mm) (Step 109). If $G1 \leqq G0 \leqq G2$, a point dividing the gap distance G0 at a previously specified ratio of m:n is determined as the butt position (Step 110).

On the other hand, as a result of the comparison in Step 109, when the gap distance G0 is greater than the upper limit distance G2 ($G0>G2$), the gap distance G0 is so great as to be unsuitable for welding, so that in this case it is determined that the welding cannot be done, and the determined result is sent to a welding control device (NC main body) to indicate by giving an alarm or the like (Step 111) that the welding cannot be done. When the gap distance G0 is shorter than the lower limit distance G1 ($G0<G1$) in Step 109, go to Steps 106 and 107, and the lowest point c is determined as the butt position 48 in the same way as in the above.

In the above-described flowchart, a case in which both of the recess detecting line 62 and the gap detecting line 70 are used for detecting the butt position 48 is shown, but the gap detecting line 70 does not have to be used.

INDUSTRIAL AVAILABILITY

The present invention is useful as a workpiece butt position detecting method for butt welding, by which an accurate butt position of workpieces, even having sags at the ends thereof, can be easily detected, and by which a suitable position corresponding to the butt position is set according to a detected gap distance, while poor welding can be prevented if the gap distance is great.

We claim:

1. A method for detecting a position of a butt line along which first and second workpieces are butted together, said first workpiece having a surface which extends to said butt line, said second workpiece having a surface which extends to said butt line, wherein at least one of said surfaces lowers as it approaches said butt line, said method comprising the steps of:

- irradiating a light beam on at least one of said surface of said first workpiece and said surface of said second workpiece;
- scanning said light beam along a scan line from a first one of said surfaces across said butt line to a second one of said surfaces so that said scan line extends across said at least one lowering surface;
- detecting positions of said surfaces along said scan line by reflection of said light beam by said surfaces; and
- determining, from the thus detected positions of said surfaces along said scan line, the position of said butt line; wherein said step of determining comprises:
  - setting a recess detecting line at a position below a top portion of each of said surfaces of said first and second workpieces;
  - determining if said recess detecting line crosses the detected positions of said surfaces at two points along said scan line;
  - when said recess detecting line crosses the detected positions of said surfaces at two points along said scan line, determining a distance between said two points; and
  - when said distance is less than a specified value, dividing said distance at a specified ratio so that a point at which said distance is divided at said specified ratio is determined as the position of said butt line.

2. A method for detecting a position of a butt line along which first and second workpieces are butted together, said first workpiece having a surface which extends to said butt line, said second workpiece having a surface which extends to said butt line, wherein at least one of said surfaces lowers as it approaches said butt line, said method comprising the steps of:

- irradiating a light beam on at least one of said surface of said first workpiece and said surface of said second workpiece;
- scanning said light beam along a scan line from a first one of said surfaces across said butt line to a second one of said surfaces so that said scan line extends across said at least one lowering surface;
- detecting positions of said surfaces along said scan line by reflection of said light beam by said surfaces; and
- determining, from the thus detected positions of said surfaces along said scan line, the position of said butt line; wherein said step of determining comprises:
  - setting a recess detecting line at a position below a top portion of each of said surfaces of said first and second workpieces;
  - determining if said recess detecting line crosses the detected positions of said surfaces at two points along said scan line; and
  - when said recess detecting line crosses the detected positions of said surfaces at two points along said scan line, determining a lowest position of the detected surface positions between said two points as the position of said butt line.

3. A method for detecting a position of a butt line along which first and second workpieces are butted together, said first workpiece having a surface which extends to said butt line, said second workpiece having a surface which extends to said butt line, wherein at least one of said surfaces lowers as it approaches said butt line, said method comprising the steps of:

irradiating a light beam on at least one of said surface of said first workpiece and said surface of said second workpiece;

scanning said light beam along a scan line from a first one of said surfaces across said butt line to a second one of said surfaces so that said scan line extends across said at least one lowering surface;

detecting positions of said surfaces along said scan line by reflection of said light beam by said surfaces; and determining, from the thus detected positions of said surfaces along said scan line, the position of said butt line; wherein said step of determining comprises:

setting a recess detecting line at a position below a top portion of each of said surfaces of said first and second workpieces;

determining if said recess detecting line crosses the detected positions of said surfaces at two points along said scan line;

setting a gap detecting line at a specified position below said recess detecting line;

determining if said gap detecting line crosses the detected positions of said surfaces along said scan line; and when said recess detecting line crosses the detected positions of said surfaces at two points along said scan line and said gap detecting line does not cross the detected positions of said surfaces along said scan line, determining a lowest position of the detected surface positions between said two points as the position of said butt line.

4. A method in accordance with claim 3, wherein:

in the event that said detected surface positions cross said recess detecting line at a first location from above to below said recess detecting line and then successive detected surface positions cross said recess detecting line from below to above said recess detecting line within a specified scanning distance along said scan line subsequent to said first location, the step of determining a lowest position of said surfaces between said two points along said scan line as the position of said butt line comprises the step of ignoring the crossing from above to below at said first location; and in the event that said detected surface positions cross said recess detecting line at a second location from below to above said recess detecting line, and then successive detected surface positions cross said recess detecting line from above to below within a specified scanning distance along said scan line subsequent to said second location, the step of determining a lowest position of said surfaces between said two points along said scan line as the position of said butt line comprises the step of ignoring the crossing from below to above at said second location.

5. A method in accordance with claim 3, wherein said recess detecting line comprises a first recess detecting line segment which is set for said first workpiece and a second recess detecting line segment which is separately set for said second workpiece.

6. A method in accordance with claim 5, wherein:

in the event that said detected surface positions cross said recess detecting line at a first location from above to below said recess detecting line and then successive detected surface positions cross said recess detecting line from below to above said recess detecting line within a specified scanning distance along said scan line subsequent to said first location, the step of determining a lowest position of said surfaces between said two points along said scan line as the position of said butt line comprises the step of ignoring the crossing from above to below at said first location; and in the event that said detected surface positions cross said recess detecting line at a second location from below to above said recess detecting line, and then successive detected surface positions cross said recess detecting line from above to below within a specified scanning distance along said scan line subsequent to said second location, the step of determining a lowest position of said surfaces between said two points along said scan line as the position of said butt line comprises the step of ignoring the crossing from below to above at said second location.

7. A method for detecting a position of a butt line along which first and second workpieces are butted together, said first workpiece having a surface which extends to said butt line, said second workpiece having a surface which extends to said butt line, wherein at least one of said surfaces lowers as it approaches said butt line, said method comprising the steps of:

irradiating a light beam on at least one of said surface of said first workpiece and said surface of said second workpiece;

scanning said light beam along a scan line from a first one of said surfaces across said butt line to a second one of said surfaces so that said scan line extends across said at least one lowering surface;

detecting positions of said surfaces along said scan line by reflection of said light beam by said surfaces; and determining, from the thus detected positions of said surfaces along said scan line, the position of said butt line; wherein said step of determining comprises:

setting a recess detecting line at a position below a top portion of each of said surfaces of said first and second workpieces;

determining if said recess detecting line crosses the detected positions of said surfaces at two points along said scan line;

setting a gap detecting line at a specified position below said recess detecting line; and when said recess detecting line crosses the detected positions of said surfaces at two points along said scan line and said gap detecting line does not cross the detected positions of said surfaces along said scan line, determining a distance between said two points, and dividing said distance at a specified ratio so that a point at which said distance is divided at said specified ratio is determined as the position of said butt line.

8. A method in accordance with claim 7, wherein:

in the event that said detected surface positions cross said recess detecting line at a first location from above to below said recess detecting line and then successive detected surface positions cross said recess detecting line from below to above said recess detecting line within a specified scanning distance along said scan line subsequent to said first location, the step of determining a distance between said two points comprises the step of ignoring the crossing from above to below at said first location; and in the event that said detected surface positions cross said recess detecting line at a second location from below to above said recess detecting line, and then successive detected surface positions cross said recess detecting line from above to below within a specified scanning distance along said scan line subsequent to said second location, the step of determining a distance between said two points comprises the step of ignoring the crossing from below to above at said second location.

9. A method in accordance with claim 7, wherein said recess detecting line comprises a first recess detecting line segment which is set for said first workpiece and a second recess detecting line segment which is set for said second workpiece.

10. A method in accordance with claim 9, wherein:

in the event that said detected surface positions cross said recess detecting line at a first location from above to below said recess detecting line and then successive detected surface positions cross said recess detecting line from below to above said recess detecting line within a specified scanning distance along said scan line subsequent to said first location, the step of determining a distance between said two points comprises the step of ignoring the crossing from above to below at said first location; and in the event that said detected surface positions cross said recess detecting line at a second location from below to above said recess detecting line, and then successive detected surface positions cross said recess detecting line from above to below within a specified scanning distance along said scan line subsequent to said second location, the step of determining a distance between said two points comprises the step of ignoring the crossing from below to above at said second location.

11. A method for detecting a position of a butt line along which first and second workpieces are butted together, said first workpiece having a surface which extends to said butt line, said second workpiece having a surface which extends to said butt line, wherein at least one of said surfaces lowers as it approaches said butt line, said method comprising the steps of:

irradiating a light beam on at least one of said surface of said first workpiece and said surface of said second workpiece;

scanning said light beam along a scan line from a first one of said surfaces across said butt line to a second one of said surfaces so that said scan line extends across said at least one lowering surface; and detecting positions of said surfaces along said scan line by reflection of said light beam by said surfaces; and determining, from the thus detected positions of said surfaces along said scan line, the position of said butt line; wherein said step of determining comprises:

setting a recess detecting line at a position below a top portion of each of said surfaces of said first and second workpieces;

setting a gap detecting line at a specified position below said recess detecting line;

when said gap detecting line crosses the detected positions of said surfaces at two locations along said scan line, determining a distance between said two locations; and when said distance is between a lower limit value and an upper limit value, dividing said distance at a specified ratio so that a point at which said distance is divided at said specified ratio is determined as the position of said butt line.

12. A method for detecting a position of a butt line along which first and second workpieces are butted together, said first workpiece having a surface which extends to said butt line, said second workpiece having a surface which extends to said butt line, wherein at least one of said surfaces lowers as it approaches said butt line, said method comprising the steps of:

irradiating a light beam on at least one of said surface of said first workpiece and said surface of said second workpiece;

scanning said light beam along a scan line from a first one of said surfaces across said butt line to a second one of said surfaces so that said scan line extends across said at least one lowering surface;

detecting positions of said surfaces along said scan line by reflection of said light beam by said surfaces; and determining, from the thus detected positions of said surfaces along said scan line, the position of said butt line; wherein said step of determining comprises:

setting a recess detecting line at a position below a top portion of each of said surfaces of said first and second workpieces;

setting a gap detecting line at a specified position below said recess detecting line;

when said gap detecting line crosses the detected positions of said surfaces at two locations along said scan line, determining a distance between said two locations; and when said distance is less than a lower limit value, determining a lowest detected surface position between said two locations along said scan line as the position of said butt line.

13. A method for detecting a position of a butt line along which first and second workpieces are butted together, said first workpiece having a surface which extends to said butt line, said second workpiece having a surface which extends to said butt line, wherein at least one of said surfaces lowers as it approaches said butt line, said method comprising the steps of:

irradiating a light beam on at least one of said surface of said first workpiece and said surface of said second workpiece;

scanning said light beam along a scan line from a first one of said surfaces across said butt line to a second one of said surfaces so that said scan line extends across said at least one lowering surface;

detecting positions of said surfaces along said scan line by reflection of said light beam by said surfaces; and determining, from the thus detected positions of said surfaces along said scan line, the position of said butt line; wherein said step of determining comprises:

setting a recess detecting line at a position below a top portion of each of said surfaces of said first and second workpieces; and in the event that said detected surface positions cross said recess detecting line at a first location from above to below said recess detecting line and then successive detected surface positions cross said recess detecting line from below to above said recess detecting line within a specified scanning distance along said scan line subsequent to said first location, the step of ignoring the crossing from above to below at said first location; and in the event that said detected surface positions cross said recess detecting line at a second location from below to above said recess detecting line, and then successive detected surface positions cross said recess detecting line from above to below within a specified scanning distance along said scan line subsequent to said second location, the step of ignoring the crossing from below to above at said second location.

14. A method for detecting a position of a butt line along which first and second workpieces are butted together, said first workpiece having a surface which extends to said butt line, said second workpiece having a surface which extends to said butt line, wherein at least one of said surfaces lowers as it approaches said butt line, said method comprising the steps of:

irradiating a light beam on at least one of said surface of said first workpiece and said surface of said second workpiece;

scanning said light beam along a scan line from a first one of said surfaces across said butt line to a second one of said surfaces so that said scan line extends across said at least one lowering surface;

detecting positions of said surfaces along said scan line by reflection of said light beam by said surfaces; and determining, from the thus detected positions of said surfaces along said scan line, the position of said butt line; wherein said step of determining comprises:

setting a recess detecting line at a position below a top portion of each of said surfaces of said first and second workpieces, wherein said recess detecting line comprises a first recess detecting line segment which is set for said first workpiece and a second recess detecting line segment which is set for said second workpiece.

15. A method in accordance with claim 14, wherein:

in the event that said detected surface positions cross said recess detecting line at a first location from above to below said recess detecting line and then successive detected surface positions cross said recess detecting line from below to above said recess detecting line within a specified scanning distance along said scan line subsequent to said first location, the step of determining, from the detected positions of said surfaces along said scan line, the position of said butt line comprises the step of ignoring the crossing from above to below at said first location; and in the event that said detected surface positions cross said recess detecting line at a second location from below to above said recess detecting line, and then successive detected surface positions cross said recess detecting line from above to below within a specified scanning distance along said scan line subsequent to said second location, the step of determining, from the detected positions of said surfaces along said scan line, the position of said butt line comprises the step of ignoring the crossing from below to above at said second location.

16. A method of welding first and second workpieces together along a butt line along which said first and second workpieces are butted together, said first workpiece having a surface which extends to said butt line, said second workpiece having a surface which extends to said butt line, wherein at least one of said surfaces lowers as it approaches said butt line, said method comprising the steps of:

irradiating a light beam on at least one of said surface of said first workpiece and said surface of said second workpiece;

scanning said light beam along a scan line from a first one of said surfaces across said butt line to a second one of said surfaces so that said scan line extends across said at least one lowering surface;

detecting positions of said surfaces along said scan line by reflection of said light beam by said surfaces;

setting a detecting line at a position below a top portion of each of said surfaces of said first and second workpieces;

determining two points where said detecting line crosses the detected positions of said surfaces along said scan line;

determining a distance between said two points; and determining from said distance whether welding along said butt line can be conducted.

17. A method in accordance with claim 16, further comprising:

when said distance is less than a specified value, dividing said distance at a specified ratio so that a point at which said distance is divided at said specified ratio is determined as the position of said butt line; and welding said first workpiece to said second workpiece along the thus determined position of said butt line.

18. A method in accordance with claim 16, further comprising:

when said distance exceeds a specified value, providing a signal that welding should not be attempted.

19. A method in accordance with claim 16, wherein said detecting line is a recess detecting line; further comprising the steps of:

setting a gap detecting line at a specified position below said recess detecting line;

when said recess detecting line crosses the detected positions of said surfaces at two points along said scan line and said gap detecting line does not cross the detected positions of said surfaces along said scan line, dividing said distance between said two points at a specified ratio so that a point at which said distance is divided at said specified ratio is determined as the position of said butt line; and welding said first workpiece to said second workpiece along the thus determined position of said butt line.

20. A method in accordance with claim 19, further comprising:

when said gap detecting line crosses the detected positions of said surfaces at two locations along said scan line, the step of determining a distance between said two locations; and when the location between said two locations is greater than an upper limit value, the step of providing a signal that welding should not be attempted.

* * * * *